United States Patent [19]

Kikuchi et al.

[11] Patent Number: 4,711,821

[45] Date of Patent: Dec. 8, 1987

[54] OPTO-MAGNETIC RECORDING MEDIUM

[75] Inventors: Kazuhiko Kikuchi, Kawasaki; Kazuoki Honguu; Mitsuharu Sawamura, both of Yokohama, all of Japan

[73] Assignee: Canon Kabushiki Kaisha, Tokyo, Japan

[21] Appl. No.: 749,631

[22] Filed: Jun. 28, 1985

[30] Foreign Application Priority Data

Jul. 13, 1984 [JP] Japan ................................ 59-144402

[51] Int. Cl.$^4$ ............................................. G11B 7/24
[52] U.S. Cl. .................................... 428/457; 428/472;
  428/694; 428/698; 428/702; 428/704; 428/900
[58] Field of Search ................. 365/122; 360/131, 135;
  428/694, 900, 704, 702, 698, 472, 457; 430/945

[56] References Cited

U.S. PATENT DOCUMENTS

| 4,042,341 | 8/1977 | Smeggil | 428/678 |
| 4,414,650 | 11/1983 | Ohta et al. | 365/122 |
| 4,525,028 | 6/1985 | Dorschner | 350/377 |
| 4,579,777 | 4/1986 | Honguu et al. | 428/693 |

FOREIGN PATENT DOCUMENTS 56242 3/1984 Japan.
175049 10/1984 Japan.

OTHER PUBLICATIONS

Takahashi et al., "Magneto-Optic Properties of GdTbFe Thin Films", Nov. 1983, Sharp Corporation.
Katayama et al., "Study of High Reliability of the Magneto-Optic Medium with the Multiplayer Structure", Nov. 1983, Sharp.
Cuomo et al., "Antireflection Coatings for the Enhancement of Magneto-Optic Effects...", IBM TDB, vol. 16, No. 5, Oct. 1973, p. 1442.
Bell et al., "Antireflection Structures for Optical Recording", IEEE 1978 (month unknown).
Keay et al., "Longitudinal Kerr Magneto-Optic Effect in Multilayer Structures of Dielectric and Magnetic Films", Optica Acta 1968, vol 15, No. 4, pp. 373-388.

Primary Examiner—George F. Lesmes
Assistant Examiner—William M. Atkinson
Attorney, Agent, or Firm—Fitzpatrick, Cella, Harper & Scinto

[57] ABSTRACT

An opto-magnetic recording medium comprises a transparent plastic substrate, a magnetic recording layer provided on the plastic substrate, and two or more thin film layers provided between the plastic substrate and the magnetic recording layer and decreasing the reflectance of the magnetic recording layer for a light entering from the substrate side. At least one of the thin film layers except the layer which is in contact with the plastic substrate is formed of $Si_3N_4$.

5 Claims, 5 Drawing Figures

OPTO-MAGNETIC RECORDING MEDIUM

BACKGROUND OF THE INVENTION

1. Field of the Invention

This invention relates to an opto-magnetic recording medium capable of recording or reproducing information by a light beam being applied thereto.

2. Description of the Prior Art

As opto-magnetic recording mediums, there are known mediums having as a recording layer a polycrystal thin film such as MnBi or MnCuBi, an amorphous thin film such as GdCo, GdFe, TbFe, DyFe, GdTbFe or TbDyFe, or a single crystal thin film such as $TbFeO_3$.

Of these thin films, the amorphous thin film has recently been considered to be excellent as the recording layer of the opto-magnetic recording meidum when the film forming property with which a thin film of a great area is made at a temperature in the vicinity of room temperature, the writing efficiency for writing signals with small opto-thermal energy and the reading-out efficiency for reading out the written signals at a good S/N ratio are taken into account. Particularly, the amorphous thin film GdTbFe has a great Kerr rotation angle and a curie point of about 150° C. and is therefore suitable as the recording layer. Further, as a result of the study continued in order to improve the Kerr rotation angle, it has been found that the amorphous thin film GdTbFeCo has a sufficiently great Kerr rotation angle and permits reading-out with a good S/N ratio.

Researches have been actively carried out to progress the improvement of the characteristics of magnetic materials which are the recording layer in this manner to thereby improve the recording efficiency and the reproducing efficiency and on the other hand, to effectively utilize the applied light energy to improve the recording efficiency and the reproducing efficiency. For example, the aforementioned recording layer is provided on a light-transmitting substrate formed of plastic material or the like and the recording or reproducing light is applied from the substrate side, and an antireflection film has been provided between the substrate and the recording layer.

However, the conventional antireflection layer has often given rise to various disadvantages. That is, depending on the material forming the antireflection layer, there has occurred a disadvantage that the layer has a sufficient refractive index to perform the antireflection effect but is poor in adherence property with respect to the substrate and is thus liable to cause peel-off or crack or a disadvantage that the layer is good in adherence property but is low in refractive index and cannot provide a sufficient antireflection effect and thus, a sufficiently satisfactory anti-reflection layer has not yet been obtained.

SUMMARY OF THE INVENTION

It is an object of the present invention to provide an opto-magnetic recording medium which has high recording and reproducing efficiency and in which peel-off,crack or the like is not liable to occur.

The above object of the present invention is achieved by constracting the opto-magnetic recording medium of a transparent plastic substrate, a magnetic recording layer provided on said plastic substrate, and two or more thin film layers provided between said plastic substrate and said magnetic recording layer and decreasing the reflectance of said magnetic recording layer for a light entering from the substrate side, at least one of said thin film layers except the layer which is in contact with said plastic substrate being formed of $Si_3N_4$.

DESCRIPTION OF THE PREFERRED EMBODIMENTS

The opto-magnetic recording medium of the present invention will hereinafter be described in detail by reference to the drawings.

Figure 1:
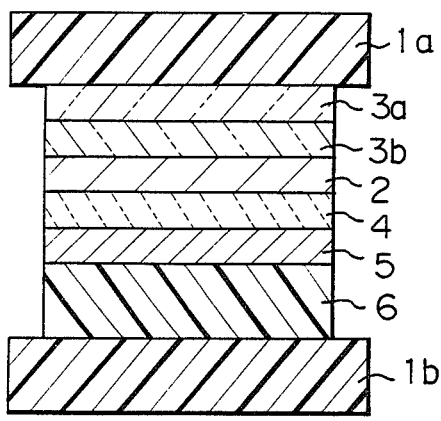
FIG. 1 is a schematic cross-sectional view showing an example of the construction of the opto-magnetic recording medium of the present invention.

FIG. 1 is a cross-sectional view showing an example of the construction of the opto-magnetic recording medium according to the present invention.

Designated by 1a is a plastic substrate which may be formed of a material such as acrylic resin or polycarbonate.

Reference numeral 2 designates a magnetic recording layer which may be a conventional amorphous magnetic film, for example, an amorphous thin film such as GdCo, GdFe, GdTbFe, TbDyFe or GdTbFeCo. Particularly, GdTbFe or GdTbFeCo is desirable because they have a great Kerr rotation angle and a low curie point and thus permit efficient recording and reading of a good S/N ratio. It is preferable that the film thickness of the magnetic recording layer 2 be usually of the order of 100ÅA–200ÅA.

Denoted by 3a and 3b are antireflection layers. These antireflection layers 3a and 3b are for effectively utilizing an applied recording light or reproducing light on the recording medium, and the antireflection layer 3b which is not in contact with the plastic substrate 1a is formed by the use of $Si_3N_4$. The antireflection layer 3a provided in contact with the plastic substrate 1a is formed of a material such as SiO which is excellent in adherence property with respect to the plastic substrate 1a. $Si_3N_4$ which is the material of the antireflection layer 3b provided adjacent to the recording layer 2 is poor in adherence property with respect to plastic but very high in refractive index. Accordingly, regarding these two antireflection layers as a unit, they are antireflection layers which are very excellent in adherence property with respect to the plastic substrate 1a and in antireflection effect.

The antireflection layers 3a and 3b have also the function of preventing the magnetic recording layer 2 from being deteriorated by moisture, oxygen or the like. That is, the magnetic recording layer 2 (particularly where its film thickness is as thin as several hundred ÅA) has its magnetic characteristic deteriorated by the moisture, oxygen or the like from the substrate 1a side, but in the present invention, the two antireflection layers 3a and 3b hinder the transmission of moisture or oxygen and thus prevent deterioration of the magnetic recording layer 2 and improve the corrosion resistance thereof. In the present invention, the antireflection layer comprises two layers, one of which is formed of $Si_3N_4$ having small moisture permeability, and therefore can improve the corrosion resistance of the magnetic recording layer 2 more than the conventional single antireflection layer or two or more antireflection layers which do not contain $Si_3N_4$. It is preferable that the ratio of the film thicknesses of the antireflection layers 3a and 3b be of the order of 1 : 1.

Reference numeral 4 designates a spacer layer which has the function of regulating the film thickness of the entire opto-magnetic recording medium as well as the function of improving the corrosion resistance thereof. The material of this spacer layer 4 may be $Si_3N_4$, AlN, SiO, $SiO_2$, $Al_2O_3$, $Cr_2O_3$ or the like.

Denoted by 5 is a reflection layer which, during reproduction, performs the function of reflecting the light transmitted through the magnetic recording layer 2 and combining the reflected light with a light reflected by the magnetic recording layer 2. The former reflected light is subjected to the Faraday effect and the latter reflected light is subjected to the Kerr effect and therefore, if the combined lights are detected, the apparent Kerr rotation angle is improved. A metal film such as Au, Cu or Al may be mentioned as the material usable for this reflection layer.

The antireflection layers 3a, 3b, the magnetic recording layer 2, the spacer layer 4 and the reflection layer 5 can be successively formed by a film forming method such as the ion plating method, the sputtering method or the electron beam evaporation method in which the material component forming the respective layers are supplied from a single evaporation source or multiple evaporation sources.

Designated by 1b is a plastic substrate provided on the reflection layer 5 with an adhesive layer 6 interposed therebetween.

The spacer layer 4, the reflection layer 5 and the plastic substrate 1b are not always necessary in the opto-magnetic recording medium of the present invention, but the presence thereof is preferred in practice to further improve the recording efficiency and the reproducing efficiency or the corrosion resistance.

Figure 2:
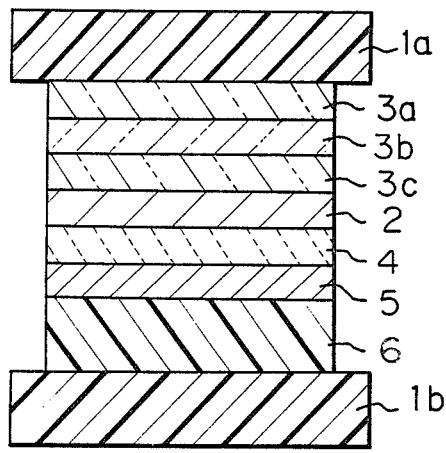
FIG. 2 is a schematic cross-sectional view showing another example of the construction of the opto-magnetic recording medium of the present invention.

FIG. 2 shows another example of the construction of the present invention in which the antireflection layer comprises three thin film layers 3a, 3b and 3c. Of the antireflection layers 3b and 3c, the antireflection layer 3c is formed of $Si_3N_4$ and the antireflection layer 3b is formed of $SiO_2$, for example. The material of the antireflection layer 3a, like the antireflection layer 3a of the opto-magnetic recording medium shown in FIG. 1, may suitably be SiO.

By such three antireflection layers, there can be provided an antireflection effect, corrosion resistance and durability similar to or more improved than those provided by the two antireflection layers.

EXAMPLE 1

On an acrylic resin substrate 1a, an antireflection layer 3a of SiO was formed by the vacuum evaporation method so that the film thickness thereof was ½ of the wavelength 6328Å used during the recording and reproduction, and an antireflection layer 3b of $Si_3N_4$ having a refractive index of about 1.9 was formed in a similar manner. Thereon, a quarternery amorphous film of GdTbFeCo having a film thickness of about 200Å was formed as a recording layer 2 by the sputtering method. Subsequently, thereon, a film of SiO having a film thickness of about 800Å as a spacer layer 4 and a film of Al having a film thickness of about 600Å as a reflection film 5 were successively formed by the vacuum evaporation method. Further, on this reflection film 5, an acrylic resin substrate 1b was cemented with a silicon adhesive 6 interposed therebetween, whereby an opto-magnetic recording medium of the construction as shown in FIG. 1 was made.

Figure 3:
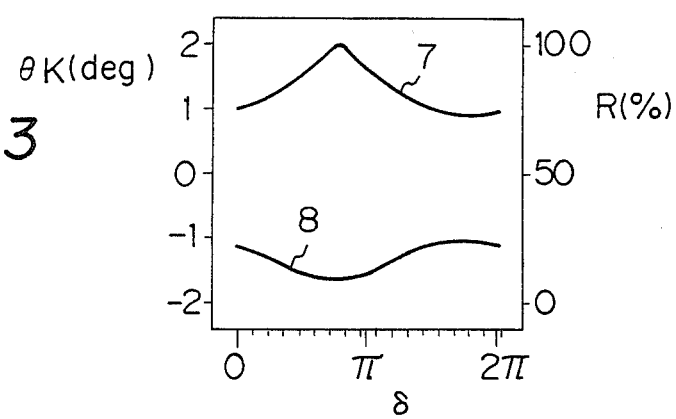
FIG. 3 is a graph showing the characteristics of the Kerr rotation angle and reflectance of a first embodiment of the present invention.

Various kinds of such opto-magnetic recording medium were made with the film thickness of the antireflection layer 3b being variously changed, and the Kerr rotation angles and reflectances thereof were measured. The result is shown in FIG. 3. In FIG. 3, the abscissa represents the values obtained by converting the film thicknesses of the antireflection layer 3b into a phase δ. The phase $\delta = 4\pi nd/\lambda$, where n is the refractive index of the layer 3b, d is the film thickness of the layer 3b, and λ is the wavelength (e.g., 6328Å) of the recording or reproducing light. The ordinate represents the Kerr rotation angle (θk) and the reflectance (R). Reference numeral 7 designates a curve indicating the Kerr rotation angle, and reference numeral 8 denotes a curve indicating the reflectance. The characteristics of the Kerr rotation angle and the reflectance repeat with $2\pi$ as the period. From this result, it can be seen that in the vicinity of $\delta = 0.8\pi$, the Kerr rotation angle becomes greatest.

COMPARISON EXAMPLE 1

Figure 4:
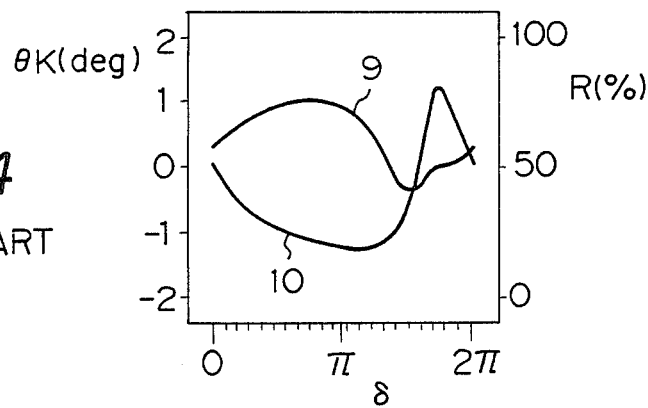
FIG. 4 is a graph showing the characteristics of the Kerr rotation angle and reflectance of a comparison example.

Various kinds of opto-magnetic recording medium different in the film thickness of the spacer layer 4 were made in a similar manner to Example 1 with the exception that instead of the antireflection layers 3a and 3b in Example 1, an antireflection layer of $SiO_2$ having a film thickness of ¼ of the wavelength used was formed by the vacuum evaporation method and that the film thickness of the spacer layer 4 was variously changed, and the Kerr rotation angles and reflectances thereof were measured. The result is shown in FIG. 4. In FIG. 4, the abscissa represents the values obtained by converting the film thicknesses of the spacer layer 4 into a phase δ, and the ordinate represents the Kerr rotation angle and the reflectance. Curve 9 indicates the Kerr rotation angle and curve 10 indicates the reflectance.

Comparing Comparison Example 1 with Example 1, it will be seen that in the conventional optomagnetic recording medium having a single layer of $SiO_2$, the Kerr rotation angle (θk) is 1° or less, but in the present invention, θk is 1° −2° and θk is apparently improved.

EXAMPLE 2

Figure 5:
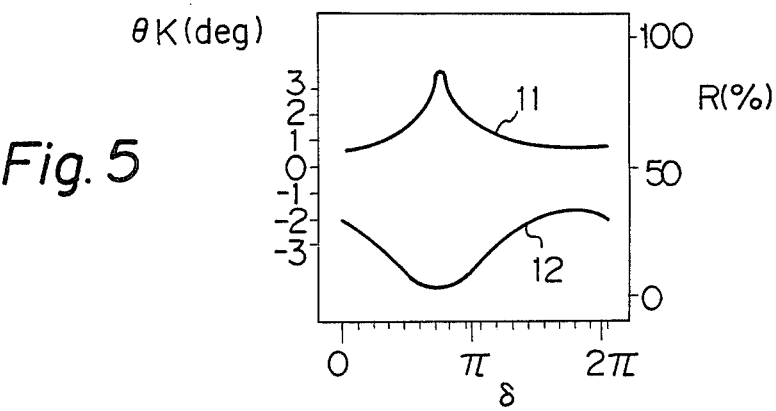
FIG. 5 is a graph showing the characteristics of the Kerr rotation angle and reflectance of a second embodiment of the present invention.

An opto-magnetic recording medium of the construction as shown in FIG. 2 was made in a similar manner to Example 1 with the exception that instead of the antireflection layers 3a and 3b in Example 1, a film 3a of SiO having a film thickness of ¼ of the wavelength used, a film 3b of $SiO_2$ having a similar film thickness and an antireflection layer 3c comprising films of $Si_3N_4$ having various film thicknesses were formed in succession from the plastic substrate 1a side, and the Kerr rotation angle and reflectance thereof were measured. The result is shown in FIG. 5. In FIG. 5, the abscissa represents the values obtained by converting the film thicknesses of the antireflection layer 3c into a phase δ, and the ordinate represents the Kerr rotation angle and the reflectance. Reference numeral 11 designates a curve indicating the Kerr rotation angle, and reference numeral 12 denotes a curve indicating the reflectance.

When the film thickness of the antireflection layer 3c is 600–700ÅÅ which corresponds to $\delta=0.8\pi$, the Kerr rotation angle is of the order of 3° and thus, it is seen that the Kerr rotation angle has been improved.

Corrosion Resistance Test:

Comparison Example 2 of a construction similar to that of Example 1 with the exception that a film of $SiO_2$ comprising a single layer having a film thickness equal to the film thickness of the entire antireflection layer of Example 1 was made, and was left in a constant-temperature constanthumidity tank of temperature 45° C. and humidity 95% for 500 hours with Example 1, whereafter the coercive forces thereof were measured. The result is shown in Table 1 below. The numerical values in the table are the relative values after 500 hours when the initial coercive force is 1.

TABLE 1

|  | Coercive for after 500 hours |
|---|---|
| Opto-magnetic recording medium made in Example 1 | 0.9 |
| Opto-magnetic recording medium made in Comparison Example 2 | 0.1 |

As is apparent from this table, the optomagnetic recording medium of the present invention is much more excellent in corrosion resistance than the conventional one.

We claim:

1. An opto-magnetic recording medium comprising:
   a transparent plastic substrate;
   a magneto-optic recording layer provided on said plastic substrate; and
   two or more thin film layers provided between said plastic substrate and said magneto-optic recording layer and decreasing the reflectance of said magneto-optic recording layer for light entering from the substrate side, said thin film layers including a layer formed of SiO which is in contact with said plastic substrate and a layer formed of $Si_3N_4$ which is interposed between said layer formed of SiO and said magneto-optic layer.

2. An opto-magnetic recording medium according to claim 1, wherein said thin film layers include said layer formed of SiO, a layer formed of $SiO_2$ and said layer formed of $Si_3N_4$ in succession from the substrate side.

3. An opto-magnetic recording medium according to claim 1, wherein said magneto-optic recording layer is formed of one of amorphous magnetic alloys GdCo, GdFe, GdTbFe, TbDyFe and GdTbFeCo.

4. An opto-magnetic recording medium according to claim 1, further comprising a spacer layer and a reflection layer successively formed on said magneto-optic recording layer.

5. An opto-magnetic recording medium according to claim 1, further comprising another substrate cemented on said magneto-optic recording layer with an adhesive layer interposed therebetween.

* * * * *

UNITED STATES PATENT AND TRADEMARK OFFICE
CERTIFICATE OF CORRECTION

PATENT NO. : 4,711,821

DATED : December 8, 1987

INVENTOR(S) : KAZUHIKO KIKUCHI, ET AL.

Page 1 of 2

It is certified that error appears in the above-identified patent and that said Letters Patent is hereby corrected as shown below:

AT [56] IN THE REFERENCES

Other Publications, under "Katayama et al.", "Multiplayer" should read --Multilayer--.

COLUMN 2

Line 44, "100ÅA-200ÅA" should read --100Å-200Å--.
Line 68, "ÅA)" should read --Å)--.

COLUMN 3

Line 67, "6328ÅA" should read --6328Å--.

COLUMN 4

Line 3, "200ÅA" should read --200Å--.
Line 6, "800ÅA" should read --800Å--.
Line 7, "600ÅA" should read --600Å--.
Line 23, "λis" should read --λ is--.
Line 23, "6328ÅA)" should read --6328Å)--.
Line 51, "optomagnetic" should read --opto-magnetic--.

UNITED STATES PATENT AND TRADEMARK OFFICE
CERTIFICATE OF CORRECTION

PATENT NO. : 4,711,821

DATED : December 8, 1987

INVENTOR(S) : KAZUHIKO KIKUCHI, ET AL.

It is certified that error appears in the above-identified patent and that said Letters Patent is hereby corrected as shown below:

COLUMN 5

Line 7, "600-700ÅA" should read --600-700Å--.
Line 16, "constanthumidity" should read --constant humidity--.
Line 32, "optomagnetic" should read --opto-magnetic--.

Signed and Sealed this

Twenty-sixth Day of April, 1988

Attest:

DONALD J. QUIGG

Attesting Officer

Commissioner of Patents and Trademarks